Sept. 16, 1958    C. G. MUENCH    2,851,724
APPARATUS FOR PRODUCING MINERAL WOOL
Filed Oct. 10, 1952    4 Sheets-Sheet 1

Inventor.
Carl G. Muench
By. Edw. L. Hampson
Attorney

Sept. 16, 1958      C. G. MUENCH      2,851,724

APPARATUS FOR PRODUCING MINERAL WOOL

Filed Oct. 10, 1952      4 Sheets-Sheet 3

Inventor.
Carl G. Muench.
By Edw. H. Hampson
Attorney.

Sept. 16, 1958     C. G. MUENCH     2,851,724
APPARATUS FOR PRODUCING MINERAL WOOL
Filed Oct. 10, 1952     4 Sheets-Sheet 4
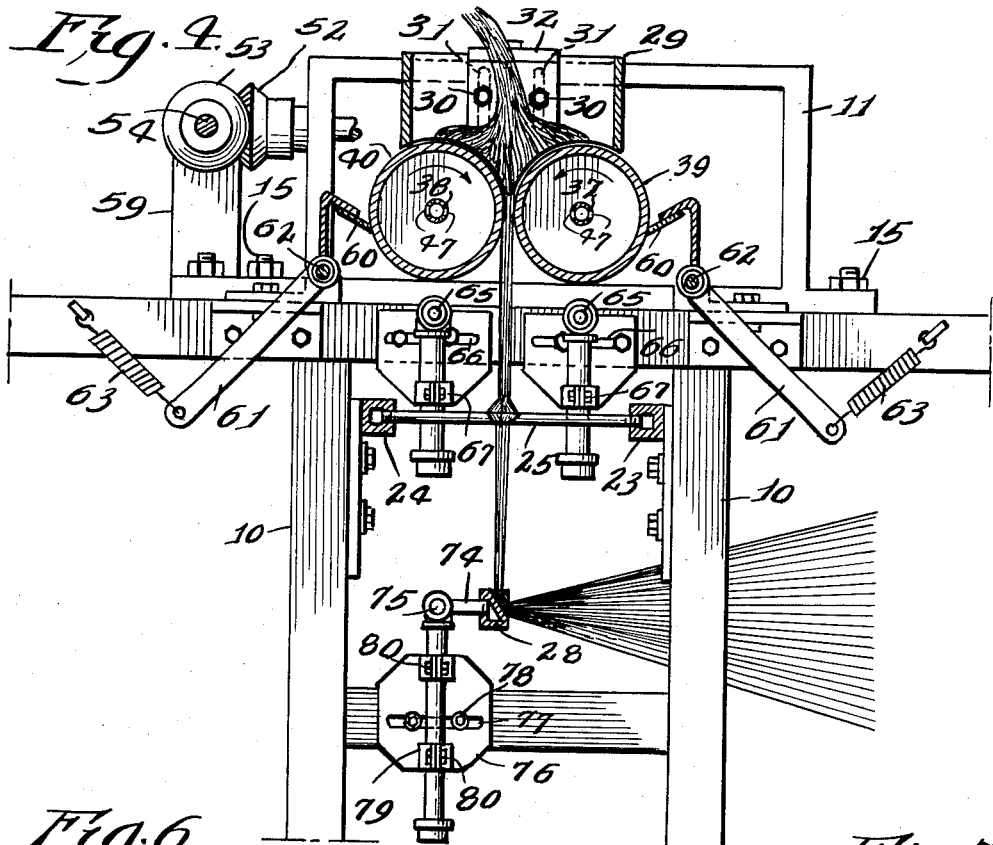
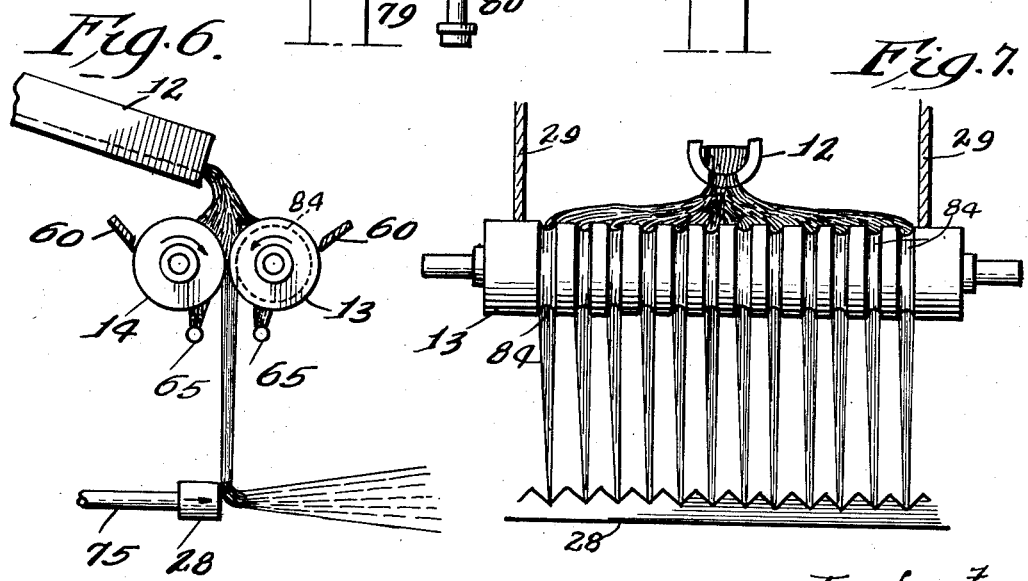
Inventor.
Carl G. Muench.
By Edw. A. Hampson
Attorney.

United States Patent Office 2,851,724
Patented Sept. 16, 1958

2,851,724

APPARATUS FOR PRODUCING MINERAL WOOL

Carl G. Muench, Chicago, Ill., assignor to The Celotex Corporation, Chicago, Ill., a corporation of Delaware Application October 10, 1952, Serial No. 314,106

7 Claims. (Cl. 18—2.5)

The invention relates to the manufacture of mineral wool, in particular to an apparatus therefor, to produce mineral wool at an increased rate of production, to produce mineral wool of improved quality, and afford economy in manufacture.

The novel apparatus hereof, in its bare essentials, comprises structure forming a stream of suitable molten material into a ribbon thereof which falls through a grating and is thus subdivided into a large number of small streams which are suitably blasted and converted to mineral fiber.

Heretofore the general practice has been to blast the entire stream of molten material either directly or after splitting once or maybe twice, or to draw the fiber from multiple, very small diameter, high temperature, heat-resistant spinnerets or nipples opening directly to the body of molten material.

Such prior apparatus has had various disadvantages and limitations in producing mineral wool, either economic, in the apparatus itself, or in the mineral wool produced.

It is the general object of this invention to provide apparatus for the production of mineral wool which avoids the disadvantages and defects of prior apparatus.

In particular it is an object of this invention to provide such apparatus whereby the feed or flow of molten material from the cupola or other source is subdivided into a large number of small streams of the molten material which may be effectively and efficiently blasted into superior mineral wool.

A still further object of the invention is the provision of apparatus whereby the stream of molten material, as received from the cupola or like source, is converted to ribbon form which, by subdivision across its width, is divided into a large number of small streams, which small streams are efficiently and economically blasted into superior mineral wool.

The apparatus of the invention hereof is illustrated in the accompanying drawings, in which—

Figure 1:
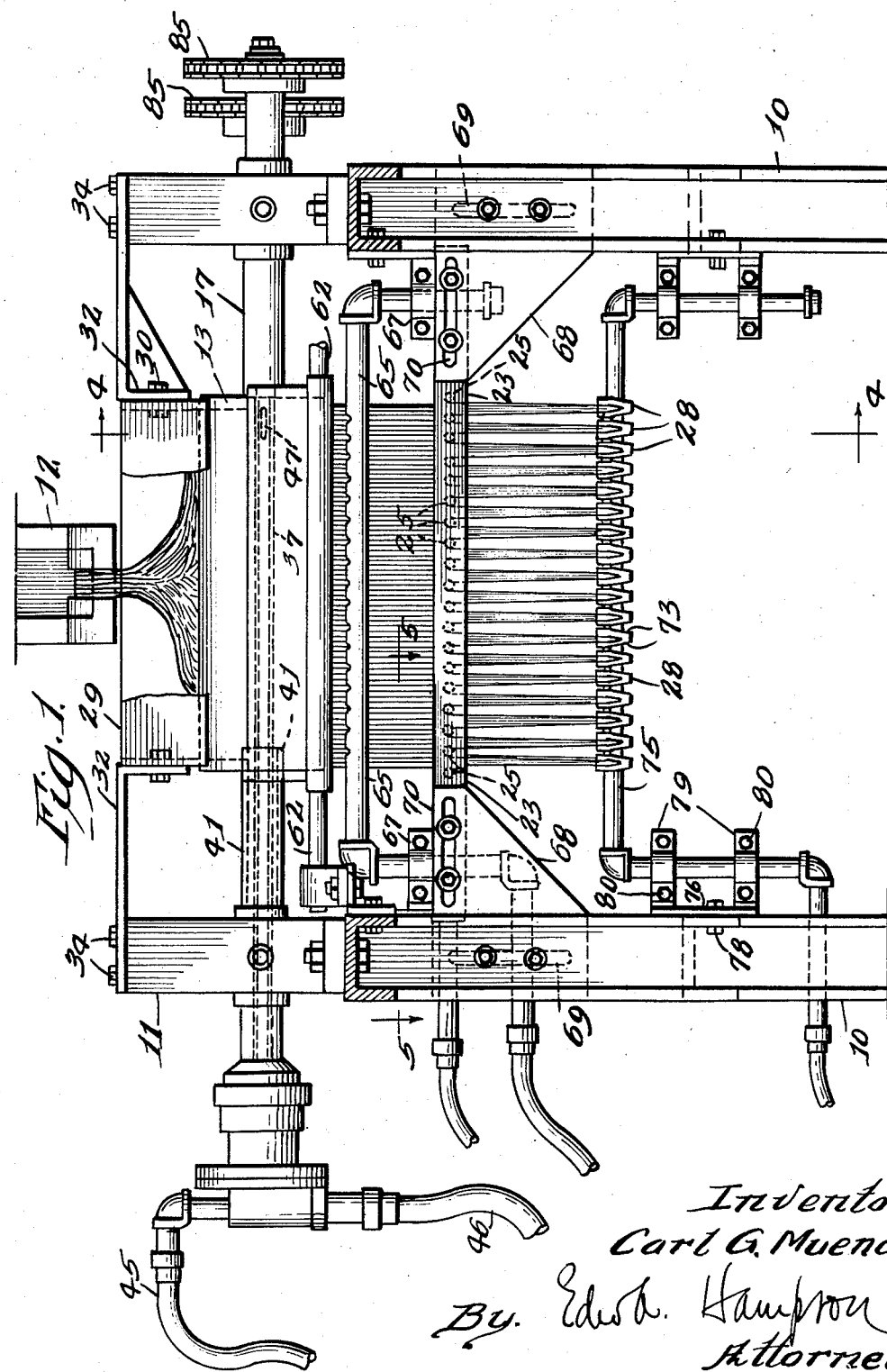
Figure 2:
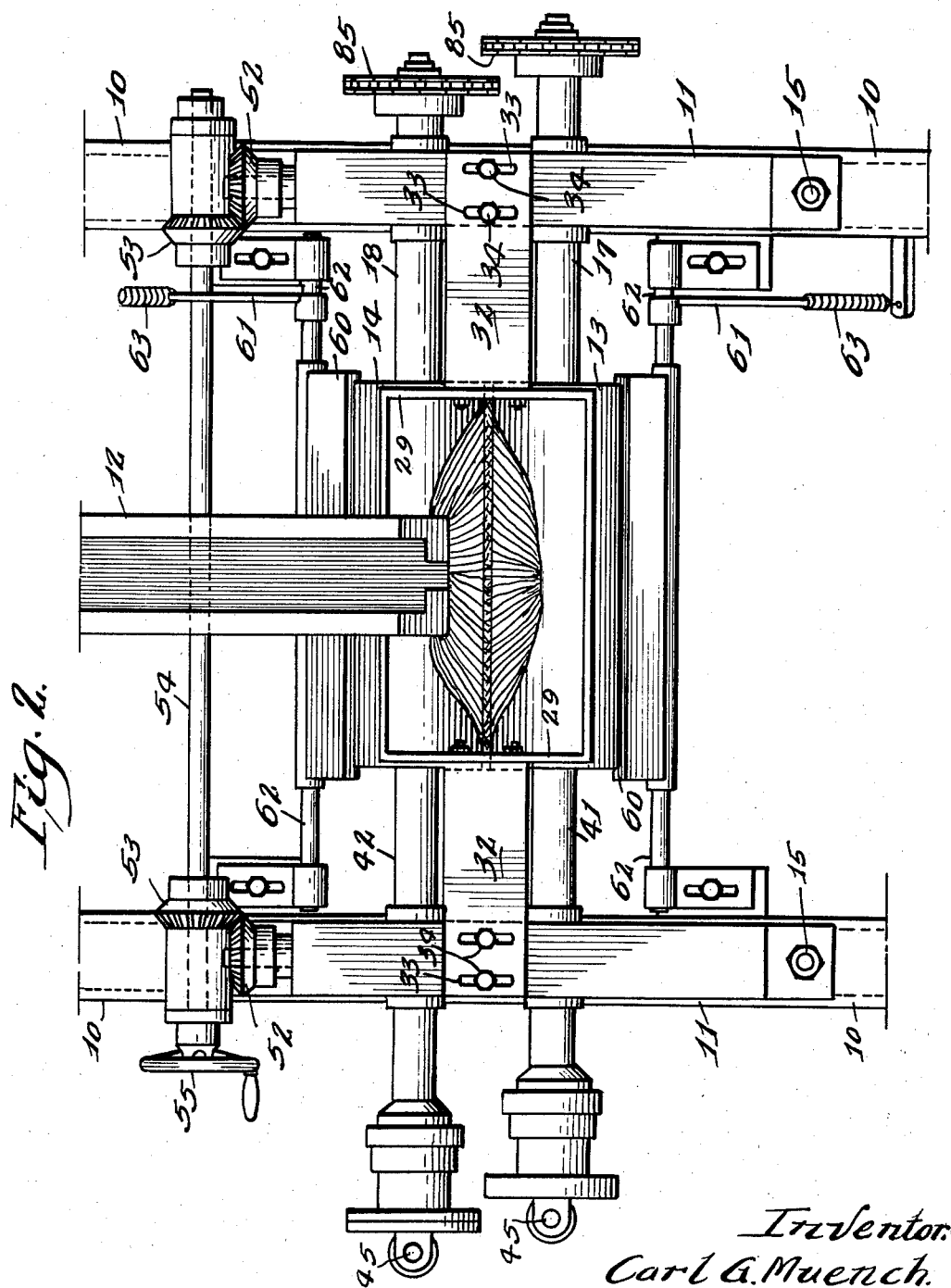
Figure 3:
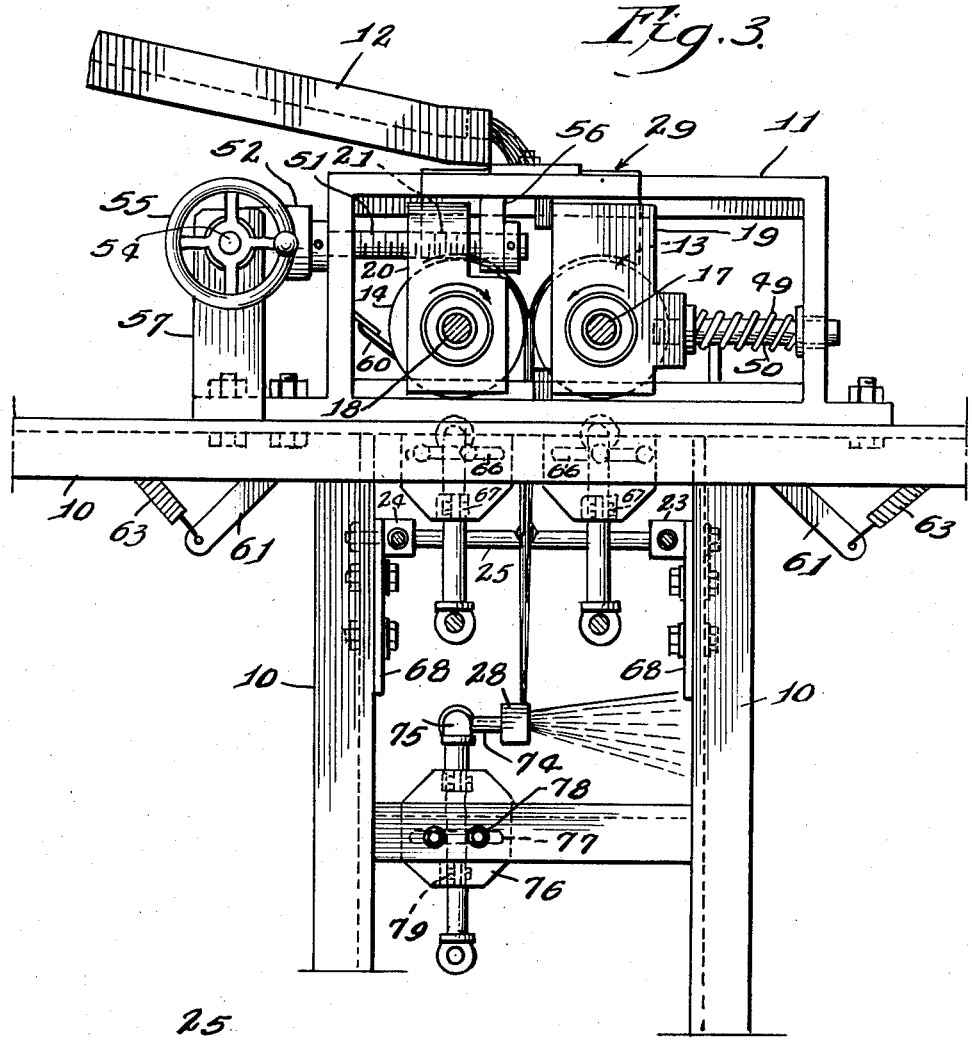
Figure 5:
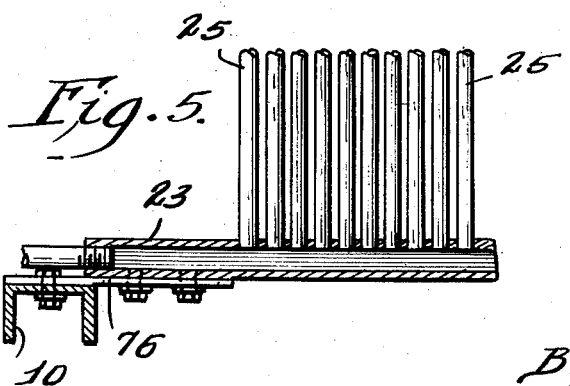

Figure 1 is a front elevation of the apparatus;
Figure 2 is a top plan view;
Figure 3 is an end elevation;
Figure 4 is a section taken on line 4—4 of Figure 1;
Figure 5 is a detail of the grid, in section taken on line 5—5 of Figure 1; and
Figures 6 and 7 are schematic or diagrammatic showings of an alternative modification of the apparatus, Figure 6 being an end elevation and Figure 7 a front elevation.

In the apparatus as illustrated there is provided a supporting frame, the various parts of which are identified by the numeral 10. Mounted to frame 10 and secured thereto in appropriate manner, as by bolts or the like 15, there is a yoke 11 in which are mounted bearing blocks 19 and 20 which, respectively, carry shafts 17 and 18 to which are mounted rolls 13 and 14.

Various details of the mounting of the rolls 13 and 14 and details concerning the other elements of the construction will not be particularly referred to in the first part of the description of the apparatus, but after the general structure has been set out, the various details of the structure will be described in detail.

Below rolls 13 and 14, and suitably mounted to the frame 10, there is provided a grate-like member, the side arms of which are identified by numerals 23 and 24 and which side arms 23 and 24 are connected by spaced cross members or grate bars 25.

Further below the grate member there is mounted a series of blast nozzles 28 which are arranged side by side and are equal in number to the number of streams of molten material formed by the passage of the molten material between the grate bars.

It will be seen that the structure so far described comprises means whereby a stream of molten slag or other suitable mineral material flowing from a cupola or other device for melting such material, and flowing from a runner or the like 12, will discharge therefrom as a sizable stream which will form a supply pool between rolls 13 and 14. This pool or supply of molten material which is formed between rolls 13 and 14 will, of course, spread out lengthwise and run through the opening between the rolls as a wide, thin ribbon of molten material. Of course, the thickness of such ribbon or material will be governed by the spacing between the peripheries of rolls 13 and 14 with, of course, the ribbon being thicker as the rolls are adjusted away from one another, and thinner as they are moved closer together. Also rotation of the rolls will have some effect in retarding or drawing such ribbon, depending upon the direction of the rotation of the rolls. It will be understood, of course, that in any case the rolls will be suitably spaced and rotated at the speed found to be most satisfactory in connection with the formation of wool from the particular molten material being supplied.

The ribbon of material feeding downwardly from rolls 13 and 14 will, upon passing through the grate bars 25, be divided into a number of small streams, depending, of course, upon the number of grate bars and width of ribbon of molten material being fed from between the rolls. It is contemplated that the supply of molten material and number of grate bars 25 will be such that something in the order of 50 or more small streams will be delivered from the grate. As the large number of small streams of molten material continue to fall they will then encounter the blast nozzles 28, of which there is one provided for each space between adjacent grate bars 25, and consequently each of these blast nozzles 28 blast one of the small streams of molten material delivered from the grate.

The overall result obtained by the use of the structure above described is that with such construction it is possible to blast the molten material into wool according to substantially the ideal condition for carrying out such operation. It has been determined that most satisfactory mineral wool, as regards the various properties of the wool itself, a content of mineral shot, mineral slugs and the like, is produced by blasting a small stream of the molten material using a small blow cap or blast nozzle. Based, of course, on the capacity of the cupola or other source of material, utilizing the inventions hereof, it is a relatively simple matter to provide an apparatus with rolls of sufficient length to feed small streams of molten material to a large number of small capacity blow nozzles or caps, and where the stream of molten material flows into the blast as a fine stream, flowing at the rate of about two pounds per minute. It will be readily apparent that by suitable subdivision of the molten material supplied there may be provided fifty small streams to produce mineral wool at 100 pounds per minute, or 100 small streams producing at the rate of about 200 pounds per minute, or such other number of streams, blast nozzles and the like, to produce on approximately such basis.

Only the general construction of the apparatus has been described above, and it is to be understood that there are numerous accessory items associated therewith which will now be described.

Above rolls 13 and 14 there is preferably provided what might be termed a container or retainer, which comprises two side walls and two end walls generally indentified by the numeral 29 and forming a box-like structure, open at the top and bottom, that is, merely with side walls. The bottom edges of the end walls are curved to substantially fit the surfaces of rolls 13 and 14 and extend downwardly in more or less of a point so as to prevent the pool of molten material between rolls 13 and 14 from running off at the ends. This retainer 29 is preferably adjustably mounted by means of bolts 30 extending through the end walls and through slots 31 which are provided in a support member 32, which support member in turn is provided with slots 33 through which extend bolts 34 which pass through yoke member 11 to secure the entire assembly of the retainer 29 and its support. It is believed to be evident, without further description, that since slots 31 and 33 are at right angles, this construction provides for both vertical and lateral adjustment of the retainer 29 with respect to the rolls 13 and 14.

Rolls 13 and 14 are preferably water-cooled, or at least have provision for cooling should such be required. Shafts 17 and 18 at one end, and driving ends, are preferably solid, whereas through the rolls, and outwardly therefrom from the other end, such shafts are preferably hollow, as is clearly apparent at 37 and 38, Figure 4. It will be understood, of course, that the hollow shaft portions 37 and 38 will be provided with suitable openings, such as slots or drilled holes or the like, at their far ends, so that water flowing through these hollow shafts may pass out into open rolls 13 and 14 and between the hollow shaft portions 37 and 38 and roll shells 39 and 40.

In the drawings, the concentric circles centrally of the rolls, and designated by numerals 41 and 42, are concentric tubes or pipes which open into the interior of the rolls just inside the ends thereof, so that the cooling water supplied by the inner hollow shaft portions 37 and 38 flows out through suitable openings 47 through the roll and then out through the pipes 41 and 42. These cooling water pipes or conduits, which as stated are parts of drive shafts 17 and 18, extend through suitable bearings, as will be subsequently described, and connect to rotary seal fittings 43 and 44 provided with supply and discharge conduits 45 and 46. The roll shafts 17 and 18 are mounted in suitable bearings in turn mounted in bearing blocks 19 and 20, in turn suitably mounted on framework 10 and between such framework and yoke 11. Bearing block 19 is yieldably mounted and spring-pressed by spring 49 mounted on a shaft 50, one end of which is secured in block 19, whereas the other end extends through a suitable opening in yoke member 11 and is slideable therethrough. Spring 49 is mounted on the shaft 50 and between block 19 and yoke 11 so as to yielding retain roll 13 in position.

Roll 14 is adjustable. Its shaft 18 is mounted in a bearing block 20 which is also slideably mounted between the upper portion of frame 10 and yoke 11. The upper portion of bearing block 20 is provided with a threaded opening 21 through which extends a threaded shaft 51 which extends through a suitable opening in yoke 11, and to the end of which there is mounted a spur gear 52, which spur gear 52 meshes with spur gear 53 which is mounted on a shaft 54 and which is provided with a handwheel 55. The inner end of threaded shaft 51 is mounted in a member 56. It is understood, of course, that shaft 54 together with its associated parts are suitably mounted to a stand 57 which is mounted and suitably secured to framework 10, as by bolt 58.

The mounting of the shafts of the rolls is similar at each end of the device, that is, roll 13 is yieldable due to its yieldable mounting at each end, and roll 14 is adjustable toward and from roll 13 and due to its mounting in adjustable bearing blocks it may be moved back and forth by suitable manipulation of handwheel 55 which, through threaded shaft 51, will accordingly move bearing block 20 toward or away from roll 13.

Rolls 13 and 14 are preferably provided with doctor blades which may or may not be necessary, and which doctor blades are spring-pressed against the peripheries of the rolls to remove any adhering particles therefrom. The blade or scraper members 60 are suitably secured to pivoted arm members 61 pivoted at 62 to the frame and provided at their outer ends with springs 63, the outer end of which springs are suitably attached to the frame 10. It will be readily apparent that the springs serve to pivot the pivoted arms on their pivots 62 to yieldably press blades 60 against the surfaces of the rolls.

Since under some conditions it may be necessary, or at least desirable, to supply heat below the rolls in the vicinity of their nip, actually to heat or maintain the temperature of the ribbon of molten material being fed from between rolls 13 and 14, there are provided elongated gas burners 65 which, it will be seen, are mounted to the frame 10 by plates 64 provided with elongated slots 66. Clamps 67 secure burners 65 to plates 64, whereby provision is made for adjusting the burners both sideways and up and down.

The device or grate member for subdividing the ribbon of molten material into a large number of small streams, and comprising side arms 23 and 24 and spaced cross members 25, preferably has provision for water cooling, and in addition the entire grate structure is adjustably mounted to the frame so that the grate may be adjusted toward or from the rolls, or may be adjusted longitudinally with respect to the rolls. The side arms 24 of the grate are hollow as are the spaced grate bars 25, and in each of the side arms there is connected conduits, one of which is a supply and the other a discharge conduit. Cooling water is supplied through a supply conduit to hollow grate side arm 23 which flows through grate bars 25 and then out from the other grate side arm 24.

To provide for the grate adjustment, at each end brackets 68 are mounted to frame 10 by bolts passing through an elongated slot 69, and the grate structure is mounted to bracket 68 by suitable bolts or studs extending from side arm members 23 and 24 through slots 70 in bracket 68, which slots are at right angles to slots 69 in such brackets. With the construction as just described, it is apparent that the bracket 68 may be adjusted either up or down, or that the grate structure may be adjusted longitudinally on these brackets to provide the desired adjustment for the grate structure.

For converting the individual molten streams there is provided a series of blow caps or nozzles 28 which can be of conventional form, but small, with ports 73 arranged in substantially V-form, and which are supplied with a gaseous medium under pressure, usually steam. The small stream of molten material when it reaches the blow caps 73 is blasted by the gas stream issuing from port 73 to convert the stream of molten material into fiber. The blow caps are each connected by a short pipe 74 to a supply pipe or header 75 which is connected to a suitable source of the blasting gas under pressure.

For adjusting the position of the blow caps, supply pipe 75 is mounted in a bracket 76 provided with a slot 77 and secured to a part of frame 10 by bolts 78. The construction of the bracket 76 incorporating slot 77 provides for lateral adjustment of the bracket with consequent lateral adjustment of the assembly of blow caps 72. To provide for vertical adjustment of the blow caps there are provided clamp members on brackets 76, which clamp members are generally identified by numeral 79. These clamps 79 are two-part clamps similar to clamps 67, and bolts 80 serve to secure the two parts of the clamps together. This construction just described provides both lateral and vertical adjustment of the blow caps, so that they may be properly positioned with respect to the individual streams of molten material as divided by the grate structure heretofore described.

The foregoing description is intended to constitute a disclosure of the presently preferred construction of the invention, but it is to be understood, of course, that the general construction of the apparatus is susceptible to numerous modifications and alterations, such as are suggested by the specific presently preferred form which is disclosed. As an example of a modified construction, the supply of molten material may be in effect subdivided into a large number of small streams in a single operation, as, for example, by the modified construction diagrammatically illustrated in Figures 6 and 7. Here, instead of using the grate construction to subdivide a ribbon of molten material into a large number of individual streams, one of the rolls, 13 or 14, or even both of the rolls may be suitably grooved, as shown at 84, and thus with the roll surfaces running in contact, the hot molten material supplied above the roll will be distributed and subdivided due to grooves 84 and will issue from below the rolls as a number of small individual streams corresponding in number to the grooves 84 provided.

A further obvious modification of the construction illustrated would be to substitute, in lieu of rolls 13 and 14, stationary surfaces, employed for forming the original stream of molten material to ribbon form, that is, to the form of a wide and relatively thin flowing stream. For such purposes there would be utilized surfaces substantially and generally similar to segments of rolls 13 and 14, that is, those arcuate portions extending from about 30° from the vertical to about 30° below the horizontal. The plates or members comprising such surfaces would, of course, be suitably mounted to a frame or suitable support, and preferably at least one of such surfaces would be so mounted that it is adjustable toward and away from the other such surface. The members forming such surfaces will, of course, be suitable plates of steel or the like which, if desired, might be provided with provisions for circulating a heating or cooling medium therethrough, and they might be of arcuate form, as referred to, or otherwise suitably curved or slanted to provide what might be termed a receiver and throat corresponding to and functioning as and for the purpose for which the rolls are provided in the preferred construction, that is, to receive the hot molten material as supplied and to re-form the flowing stream thereof into a wide and thin flowing ribbon. These variations or alternative structures being merely variations of the preferred form, and being obvious to those skilled in the art in the light of the specific disclosure hereof, such have not been illustrated but are merely mentioned as illustrative of alternative structures according to the teachings hereof.

It is understood, of course, that rolls 13 and 14 are suitably driven by chains driving sprockets 85 which are suitably mounted on shafts 17 and 18.

While the foregoing description is believed to constitute a full explanation of the operation of the apparatus, the such operation, for the sake of conciseness, may be briefly stated as follows:

A stream of molten slag or other suitable minerals is delivered above closely positioned rolls 13 and 14 which, as they rotate, deliver such material from the nip on the under side as a wide, thin flowing ribbon which, passing through a grate structure between the spaced cross members or grate bars 25, is subdivided into a large number of small streams of molten material, which individual small streams are individually blown by suitable gas under pressure supplied from individual blow caps. The gaseous material issuing from the blow caps under pressure shreds the small stream of molten material to form what is generally referred to as mineral wool or rock wool.

The inventions hereof having been fully disclosed and described in the foregoing, I claim:

1. Apparatus for converting molten mineral material to fiber form and comprising in combination a supporting frame, spaced parallel rolls mounted to the frame, means mounting a roll of the pair thereof and providing for movement of one of said rolls with respect to the other said roll, a grate-like structure mounted to the supporting frame and comprised of a plurality of spaced substantially parallel members positioned below the pair of rolls and extending transversely with respect to the roll axes, a plurality of blast nozzles positioned on centers, substantially the center lines between each adjacent pair of the substantially parallel members of said grate-like structure, and means mounting the grate-like member and the blast nozzles for relative adjustment thereof longitudinally.

2. In the combination of claim 1 the means mounting one of the said rolls to the frame comprising bearing members, means mounting each bearing member and providing variation of the spacing of the so mounted roll relative the other roll, and spring means mounted between a part of the suporting frame and a roll and yieldingly urging said roll toward the other of said rolls.

3. Apparatus for converting molten mineral material into mineral wool and comprising in combination, spaced means comprising substantially parallel surfaces constituting an open throat, the cross section thereof at least several times as long as wide, therebetween, a plurality of spaced substantially parallel rod-like members mounted below the open throat so formed, spaced therefrom and extending across the width of the projection of the open throat, and mounted below and spaced from the spaced substantially parallel members a plurality of blast nozzles, each positioned substantially beneath the spaces existing between a corresponding pair of the said spaced substantially parallel members.

4. Apparatus for converting molten mineral material into mineral wool and comprising in combination, spaced means comprising substantially parallel surfaces constituting an open throat, the cross section of which is at least several times as long as wide, therebetween, means mounting one of the substantially parallel surfaces and operable to vary the spacing of the said one substantially parallel surface relative the other thereof, a plurality of spaced substantially parallel rod-like members mounted below the said open throat spaced therefrom and extending across the width of the projection of the open throat, and mounted below and spaced from the spaced substantially parallel members a plurality of blast nozzles, each positioned substantially beneath the spaces existing between a corresponding pair of the said spaced substantially parallel members.

5. Apparatus for converting molten mineral material into mineral wool and comprising in combination, spaced means comprising substantially parallel surfaces constituting an open throat, the cross section of which is at least several times as long as wide, therebetween, means mounting one of the substantially parallel surfaces and operable to vary the spacing of the said one substantially parallel surface relative the other thereof, said means comprising a fixed abutment and a yielding member, said yielding member interposed between the one said substantially parallel surface and the fixed abutment, a plurality of spaced substantially parallel rod-like members mounted below the said open throat spaced therefrom and extending across the width of the projection of the open throat, and mounted below and spaced from the spaced substantially parallel members a plurality of blast nozzles, each positioned substantially beneath the spaces existing between a corresponding pair of the said spaced substantially parallel members.

6. Apparatus for converting molten mineral material into mineral wool and comprising in combination, spaced means comprising substantially parallel surfaces constituting an open throat, the cross section of which is at least several times as long as wide, therebetween, means mounting one of the substantially parallel surfaces and operable to vary the spacing of the one said substantially parallel surface relative the other thereof, said means comprising a fixed abutment and a yielding member, said yielding member interposed between the one said substantially parallel surface and the fixed abutment, means adjustably positioning the other said substantially parallel surface, the said means operable to vary the spacing between the said substantially parallel surfaces and securing said other substantially parallel surface relative said one substantially parallel surface, a plurality of spaced substantially parallel rod-like members mounted below the said open throat extending across the width of the projection thereof, and spaced therefrom and mounted below and spaced from the spaced substantially parallel members a plurality of blast nozzles, each positioned substantially beneath the spaces existing between a corresponding pair of said spaced substantially parallel members.

7. Apparatus for converting molten mineral material into mineral wool and comprising in combination, spaced means comprising substantially parallel surfaces constituting an open throat, the cross section of which is at least several times as long as wide, therebetween, a plurality of spaced substantially parallel rod-like members mounted below the open throat so formed extending across the width of the projection thereof, and spaced therefrom, mounted below and spaced from the spaced substantially parallel members, a plurality of blast nozzles, each positioned substantially beneath the spaces existing between a corresponding pair of the said spaced substantially parallel members, and means mounting at least one of the elements thereof, the plurality of spaced substantially parallel members and the plurality of blast nozzles as a unit and providing longitudinal movement thereof.

References Cited in the file of this patent

UNITED STATES PATENTS

| | | |
|---|---|---|
| 2,491,766 | Richardson | Dec. 20, 1949 |
| 2,585,496 | Powell | Feb. 12, 1952 |